US009024571B2

(12) United States Patent
Uyeki

(10) Patent No.: US 9,024,571 B2
(45) Date of Patent: May 5, 2015

(54) CHARGING OF ELECTRIC VEHICLES BASED ON HISTORICAL CLEAN ENERGY PROFILES

(71) Applicant: Honda Motor Co., Ltd., Minato-ku, Tokyo (JP)

(72) Inventor: Robert Masahiko Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 351 days.

(21) Appl. No.: 13/631,252

(22) Filed: Sep. 28, 2012

(65) Prior Publication Data

US 2014/0091747 A1 Apr. 3, 2014

(51) Int. Cl.
| | |
|---|---|
| H02J 13/00 | (2006.01) |
| H02J 7/00 | (2006.01) |
| H02J 7/34 | (2006.01) |
| H02J 7/35 | (2006.01) |
| B60L 11/18 | (2006.01) |

(52) U.S. Cl.
CPC ........... *H02J 13/0079* (2013.01); *H02J 7/0013* (2013.01); *H02J 7/34* (2013.01); *H02J 7/35* (2013.01); *B60L 11/184* (2013.01); *B60L 11/1844* (2013.01); *B60L 11/1846* (2013.01); *B60L 11/1861* (2013.01); *B60L 2230/40* (2013.01); *B60L 2240/622* (2013.01); *B60L 2240/70* (2013.01); *B60L 2240/72* (2013.01); *B60L 2240/80* (2013.01); *B60L 2250/12* (2013.01); *B60L 2250/14* (2013.01); *Y02T 10/7044* (2013.01); *Y02T 10/7005* (2013.01); *Y02T 10/705* (2013.01); *Y02T 90/16* (2013.01); *Y02T 90/162* (2013.01); *Y02T 10/7094* (2013.01); *Y02T 90/163* (2013.01); *Y02T 90/168* (2013.01); *Y02T 90/169* (2013.01); *Y02T 10/7291* (2013.01); *Y02T 90/121* (2013.01); *Y02T 90/14* (2013.01); *Y02T 90/128* (2013.01); *Y02T 10/7055* (2013.01); *Y02E 10/766* (2013.01); *Y04S 10/126* (2013.01); *Y04S 30/12* (2013.01); *Y04S 30/14* (2013.01); *Y02E 60/721* (2013.01)

(58) Field of Classification Search
CPC ....... H02J 13/0079; H02J 7/0013; H02J 7/34; H02J 7/35; B60L 11/184; B60L 11/1844; B60L 11/1846; B60L 11/1861
See application file for complete search history.

(56) References Cited

U.S. PATENT DOCUMENTS

| 7,693,609 | B2 * | 4/2010 | Kressner et al. | 700/291 |
|---|---|---|---|---|
| 7,792,613 | B2 | 9/2010 | Kressner et al. | |
| 7,953,519 | B2 * | 5/2011 | Hamilton et al. | 700/295 |
| 8,178,997 | B2 * | 5/2012 | Talkin et al. | 307/41 |

(Continued)

OTHER PUBLICATIONS

Fraunhofer-Gesellschaft, "Charging Up Electric Car Batters in Environmentally-Friendly Way," Jul. 24, 2010, published Apr. 21, 2010 in *Science Daily*, two pages. [Online] [Retrieved Oct. 29, 2011] Retrieved from the Internet <http://www.sciencedaily.com/releases/2010/04/100421111353.htm.>.

(Continued)

*Primary Examiner* — Naum B Levin
(74) *Attorney, Agent, or Firm* — Fenwick & West LLP

(57) ABSTRACT

The embodiments disclosed herein provide an option to drivers of electric vehicles to charge their electric vehicles using energy generated from renewable energy sources while still meeting charging requirements of the drivers. A system may schedule an electric vehicle for charging based on a historical clean energy profile.

20 Claims, 3 Drawing Sheets

(56) References Cited

U.S. PATENT DOCUMENTS

| | | | |
|---|---|---|---|
| 8,327,170 B2* | 12/2012 | Boss et al. | 713/320 |
| 8,384,358 B2* | 2/2013 | Biondo et al. | 320/155 |
| 8,508,185 B2* | 8/2013 | Basham et al. | 320/109 |
| 8,519,832 B2* | 8/2013 | Loporto et al. | 340/12.32 |
| 2010/0039062 A1 | 2/2010 | Gu | |
| 2011/0025267 A1* | 2/2011 | Kamen et al. | 320/109 |
| 2011/0047102 A1 | 2/2011 | Grider et al. | |
| 2011/0172837 A1* | 7/2011 | Forbes, Jr. | 700/291 |
| 2011/0191186 A1 | 8/2011 | Levy et al. | |
| 2011/0241604 A1* | 10/2011 | Anderson | 320/101 |
| 2013/0002188 A1* | 1/2013 | Uyeki | 320/101 |
| 2013/0110296 A1* | 5/2013 | Khoo et al. | 700/286 |
| 2013/0127416 A1* | 5/2013 | Karner et al. | 320/109 |
| 2013/0204471 A1* | 8/2013 | O'Connell et al. | 701/22 |
| 2013/0285841 A1* | 10/2013 | Kirsch | 340/932.2 |
| 2013/0334880 A1* | 12/2013 | Jerphagnon | 307/23 |

OTHER PUBLICATIONS

International Business Machines, IBM and EKZ Make Electric Vehicle Charging More Convenient with New Smartphone Application, Oct. 13, 2011, four pages. [Online] [Retrieved Oct. 29, 2011] Retrieved from the Internet <http://www-03.ibm.com/press/us/en/pressrelease/35627.wss.>.

New Research & Technology, "IBM developing EV app to let drivers select renewable energy," Oct. 14, 2011, two pages. [Online] [Retrieved Oct. 29, 2011] Retrieved from the Internet <http://www.reepedia.com/archives/2519.>.

* cited by examiner

CHARGING OF ELECTRIC VEHICLES BASED ON HISTORICAL CLEAN ENERGY PROFILES

BACKGROUND

1. Technical Field

The present disclosure generally relates to the field of charging electric vehicles.

2. Background

An electric vehicle is powered by an electric motor(s) that uses electrical energy stored in one or more batteries. When the electrical energy stored in the batteries of an electric vehicle is exhausted, the electric vehicle is connected or plugged-in to an electrical grid to recharge the batteries. The electrical grid supplies power to the electric vehicle to charge the vehicle's batteries.

Generally, utility companies implement time of use rates that describe off-peak hours associated with cheaper electricity rates. By offering the cheaper electricity rates, the utility companies encourage drivers of electric vehicles to charge their vehicles during the off-peak hours to minimize the amount of load on the electric grid during on-peak hours. Current electric vehicle charging options allow drivers to charge their vehicles during the off-peak hours, but require drivers to manually input the times that correspond to the electricity rates that will be used for charging their vehicles which is cumbersome and confusing to the drivers. However, drivers of electric vehicles are currently unable to request that their electric vehicles be charged using energy generated from renewable energy sources.

SUMMARY

The embodiments disclosed herein describe a charge scheduling server that facilitates charging of electric vehicles in a manner that maximizes the use of renewable energy available on an electric grid. When an electric vehicle is connected or plugged-in to a charging station, the driver may be prompted with various options for charging the electric vehicle. In one embodiment, the charging options include a "clean charge" option. Selection of the clean charge option indicates that the driver would like to maximize the renewable energy available on the grid to charge the electric vehicle thereby minimizing grid impact and reducing the driver's carbon foot print.

In one embodiment, if the driver selects the clean charge option, the charge scheduling server identifies a historical clean energy profile associated with the current geographical location of the electric vehicle. Generally, the historical clean energy profile describes an amount of renewable energy that has been historically available during various time periods for a particular geographical region (e.g., the Bay Area, California). For each time period, the clean energy profile describes the type of renewable energy that have been historically available to the geographical region during the time period and the contribution of the type of renewable energy to the total amount of energy historically available on the grid during the time period.

In one embodiment, the charge scheduling server calculates charge parameters for the electric vehicle based on the historical clean energy profile. The charge parameters describe a start time in which the electric vehicle is instructed to begin charging and a stop time in which the electric vehicle is instructed to stop charging. The charge scheduling server calculates the charge parameters to maximize (which includes substantially maximizing) the renewable energy on the grid according to the historical clean energy profile while still meeting various constraints of the driver such as a time when the driver requires charging of the electric vehicle to be complete.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are now described with reference to the figures where like reference numbers indicate identical or functionally similar elements. Also in the figures, the left most digits of each reference number corresponds to the figure in which the reference number is first used.

System Architecture

Electric grids are operated by utility companies that adjust the levels of energy generated by non-renewable power sources (e.g., fossil fuels) to allow as much renewable energy generation onto the electric grid. Renewable energy may be generated from various sources such as a hydroelectric power plant, a solar thermal electric plant, a wind turbine, or a solar photovoltaic plant. The embodiments disclosed herein provide a clean charge option to drivers of electric vehicles to charge their electric vehicles using energy generated from renewable energy sources while still meeting charging requirements of the owners.

Figure 1:
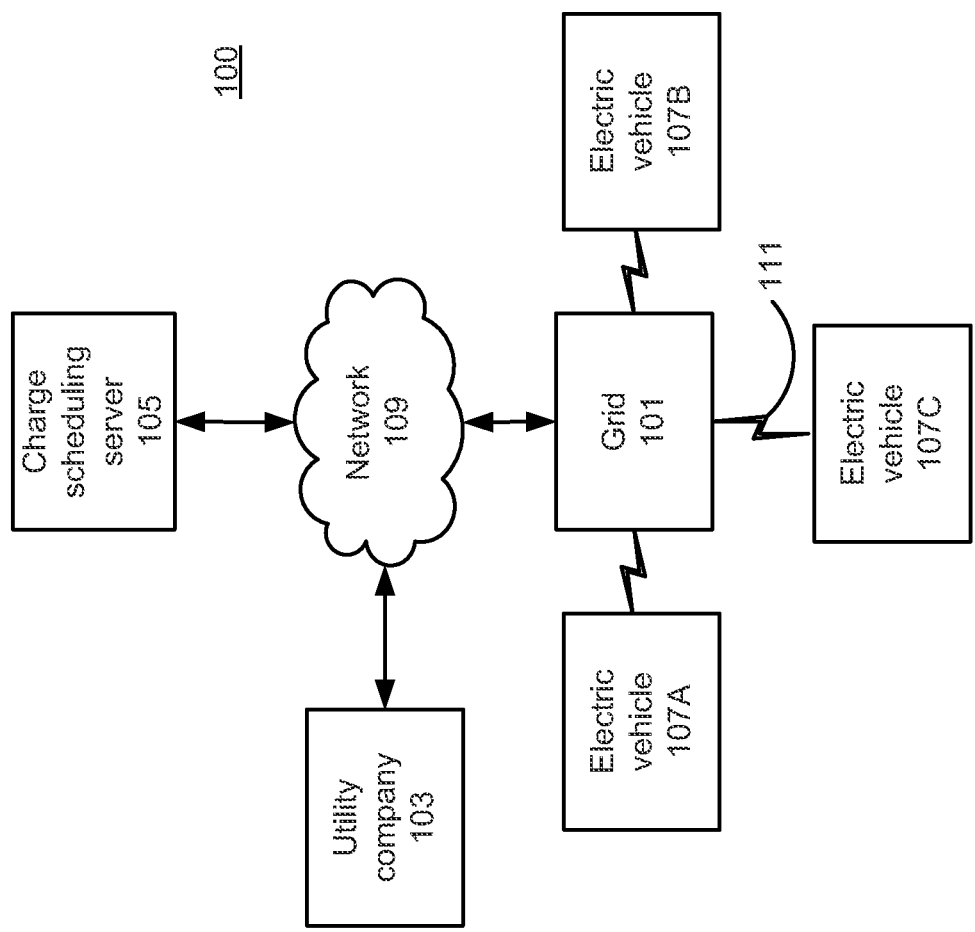
FIG. 1 illustrates an operating environment for charging electrical vehicles, according to one embodiment.

FIG. 1 illustrates an operating environment 100 for charging electric vehicles in accordance with one embodiment. Note that although the discussion herein is described with respect to electric vehicles, the embodiments are applicable to any form of plug-in vehicle such as battery powered vehicles or hybrid vehicles that require their vehicles to be recharged by plugging into the electrical grid. The operating environment 100 comprises an electrical grid 101, a utility company 103, a charge scheduling server 105, electric vehicles 107A, 107B, and 107C, a network 109, and a transmission and distribution system 111, such as high voltage transmission lines, transformers, and low voltage distribution wiring, that supplies electrical power to loads such as the electric vehicles 107. In the context of the description herein, the load refers to electric vehicles 107. However, the embodiments herein may be applied to any type of controllable load that has flexibility in its charging schedule.

In one embodiment, the utility company 103 manages the supply of power on the electrical grid 101. While only a single utility company 103 is shown in FIG. 1, multiple utility companies may be present in the operating environment 100 where each utility company services a particular geographical region. During operation of the grid 101, the utility company 103 coordinates the supply of available power to meet the power requirements of loads in the electrical grid 101 including electric vehicles 107. The utility company 103 determines the amount of supply to provide to the grid 101 and provides such power to the grid 101. In response to a signal sent through the communication network 109, e.g., the Internet, from the utility company 103, the power generated by a power plant (e.g., a fossil fuel power plant and/or a renewable energy power plant) may be increased or decreased. That is, the utility company 103 increases or decreases the power sent by the power plant through the transmission and distribution system 111 to the electrical grid 101, and thus to the electric vehicles 107.

The utility company 103 may generate clean energy profiles for the geographical region(s) in which it is responsible for supplying power. In one embodiment, a clean energy profile describes an amount of renewable energy available during various time periods of a day for a particular geographical region (e.g., the Bay Area, California). For each time period, the clean energy profile describes the type of renewable energy available to the associated geographical region during the time period and the contribution of the type of renewable energy to the total amount of energy available on the grid 101 during the time period. In one embodiment, the utility company 103 may publish clean energy profiles on a website of the utility company 103 or may provide the clean energy profiles upon request.

In one embodiment, the utility company 103 generates historical clean energy profiles based on historical data describing the types of renewable energy that have been historically (i.e., previously) available during particular time periods of previous instances of a particular date. For each day (or week or month) of the current year, the utility company 103 may identify historical information describing the total amount of renewable energy generated by a type of renewable energy source (e.g., solar thermal electric plant or wind turbine) during time periods of the specific day from previous years. The utility company 103 may calculate an average amount of renewable energy generated by a type of renewable energy source over the course of the previous time periods. The average amount of renewable energy calculated by the utility company 103 is indicative of a prediction of the amount of renewable energy that will be created by the energy source for a particular time period on a particular day of the current year.

For example, to generate a historical clean energy profile for May 25$^{th}$ of the current year for the Bay Area, California, the utility company 103 may identify clean energy profiles for May 25$^{th}$ from the past five years for the Bay Area and/or may account for the days of the week, e.g., the fourth Friday of May. For each time period indicated in the clean energy profiles from the past five years, the utility company 103 may calculate the average amount of clean energy generated by a particular renewable energy source for the Bay Area. For example, at 7:00 pm, the clean energy profiles from the past five years respectively indicate that wind power contributed to 2 percent, 3 percent, 1 percent, 2 percent, and 2 percent to the total amount of available renewable energy on the electrical grid 101 that is provided to the Bay Area at 7:00 pm on May 25$^{th}$ from the past five years. The utility company 103 calculates an average amount of wind power generated at 7:00 pm on May 25$^{th}$ (e.g., 2 percent) and uses the average amount of wind power in the historical clean energy profile for the time period of 7:00 pm on May 25$^{th}$ of the current year. Thus, from the historical information, the utility company 103 predicts that at 7:00 pm on May 25$^{th}$ of the current year, 2 percent of the total available energy on the grid 101 is provided by wind power. Table 1 shown below illustrates one example of a historical clean energy profile for May 25$^{th}$ of the current year.

TABLE 1

Example Historical Energy Profile

| Time | Wind | Geo-thermal | Solar | Hydro | Other | Fossil Fuel |
|---|---|---|---|---|---|---|
| 6:00 PM | 1% | 1% | 0% | % | % | 98% |
| 7:00 PM | 2% | 5% | 15% | 5% | 5% | 68% |
| 8:00 PM | 0% | 0% | 0% | 0% | 0% | 100% |
| 9:00 PM | 15% | 0% | 0% | 0% | 0% | 85% |
| 10:00 PM | 16% | 7% | 2% | 0% | 0% | 75% |
| 11:00 PM | 25% | 15% | 0% | 10% | 20% | 30% |
| 12:00 AM | 25% | 15% | 0% | 10% | 20% | 30% |

The historical energy profile shown in Table 1 indicates that at 7:00 PM on May 25$^{th}$ of the current year, 32 percent of the total available energy to the Bay Area was generated by a renewable energy source. Particularly, 2 percent of the available energy was generated from wind, 5 percent of the available energy was generated from geo-thermal, 15 percent of the available energy was generated from solar, 5 percent of the available energy was generated from water (i.e., hydro), and 5 percent of the available energy was generated from other renewable energy sources. The remaining 68 percent of available energy is generated from fossil fuel. The historical energy profile illustrates other various time periods of the day, the amount and type of renewable energy available during the time period.

In one embodiment, the charge scheduling server 105 facilitates charging of electric vehicles 107. The charge scheduling server 105 may represent car companies (e.g., HONDA) that determine charging schedules for electric vehicles 107. Alternatively, the charge scheduling server 105 may also represent other entities that schedule charging of electric vehicles 107. In one embodiment, the charge scheduling server 105 schedules charging of an electric vehicle 107 according to historical clean energy profiles as will be further described below.

Figure 2:
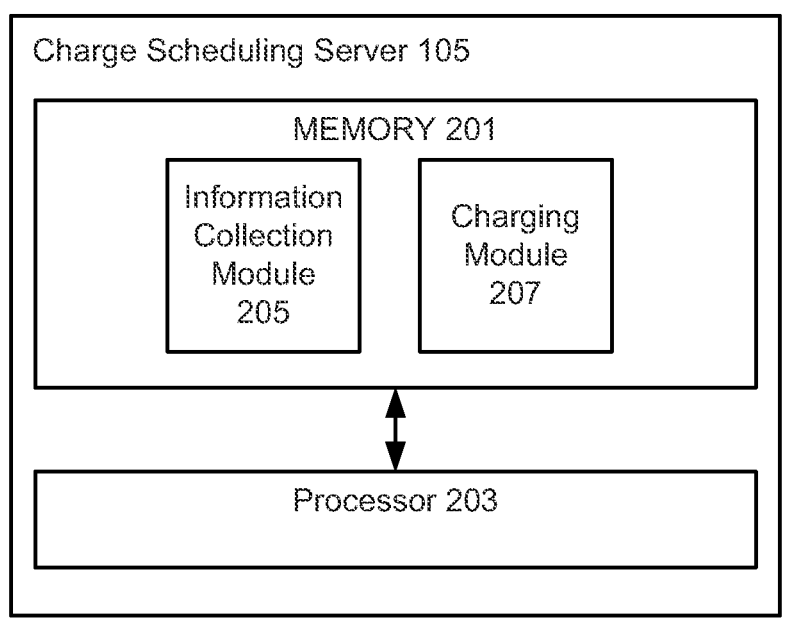
FIG. 2 illustrates a detailed view of a charge scheduling server, according to one embodiment.

Referring to FIG. 2, the charge scheduling server 105 comprises memory 201 and a processor 203. The memory 201 stores functional modules that may be executed by the processor 203. The modules may comprise code for performing any and/or all of the techniques described herein. Memory 201 may be a dynamic random access memory (DRAM) device, a static random access memory (SRAM) device, Flash RAM (non-volatile storage), combinations of the above, or some other memory device known in the art.

In one embodiment, the memory 201 comprises an information collection module 205 and a charging module 207. Note that in other embodiments, other modules may be included in the memory 201. In one embodiment, the information collection module 205 collects energy profiles such as historical clean energy profiles from the utility company 103. The information collection module 205 may request the historical clean energy profiles from the utility company 103. Alternatively, the information collection module 205 may retrieve the energy profiles published on a website of the utility company 103 by scraping the historical clean energy profiles posted on the website of the utility company.

In one embodiment, the charging module 207 provides charging instructions to electric vehicles 107. The charging module 207 may instruct the electric vehicles 107 to begin charging, stop charging, or reduce or increase the rate in which the electric vehicle 107 is charging. Once electric vehicles 107 are connected to the grid 101, the charging module 207 receives vehicle status information from the electric vehicles 107. The charging module 207 may communicate with the electric vehicles 107 via existing data connections in the electric vehicles 107 or other communication means to request vehicle status information from the electric vehicles. For example, the driver may provide the vehicle status information to the charging module 207 via a client device (e.g., a computer or a mobile phone) of the driver.

In one embodiment, the vehicle status information for an electric vehicle 107 comprises a geographic location of the electric vehicle 107. The charging module 207 may receive the geographical location in the form of geospatial identifiers such as global positioning system (GPS) coordinates associated with the current geographical location of the electric vehicle 107. The charging module 207 may alternatively receive a zip code and/or street address provided by the driver of the electric vehicle 107 if the electric vehicle 107 does not have a GPS system. In one embodiment, the current geographical location of the electric vehicle 107 is used to identify the utility company 103 responsible for supplying electrical energy to the geographical location of the electric vehicle 107 so that the clean energy profile for the geographical location may be obtained from the utility company 103.

In one embodiment, the vehicle status information for the electric vehicle 107 also comprises the current date and current time. The current date and/or current time is used by the charging module 207 to obtain a clean energy profile from the identified utility company 103 for the current date and/or time.

In one embodiment, the vehicle status information also includes the state of charge (SOC) status of the electric vehicle 107. The SOC status of an electric vehicle 107 describes the current state of charge of the batteries of the electric vehicle 107. For example, the SOC status may indicate that the electric vehicle 107 is fully charged, has no charge (i.e., zero charge), 50 percent charge, or any other state of charge between fully charged and no charge. The SOC status of the electric vehicle 107 may be used by the charging module 207 to schedule charging of the vehicle 107 as will be further described below.

In one embodiment, the charging module 207 also receives charging restraints. Charging restraints associated with an electric vehicle 107 describes various criteria that restrict when an electric vehicle 107 may be scheduled for charging. In one embodiment, charging constraints may describe constraints of the driver. In one embodiment, constraints of the driver may include the state of charge required by the driver at the completion of charging. The required state of charge describes a resulting SOC status required by the driver after the electric vehicle 107 is done charging. For example, the driver may indicate he or she wants the electric vehicle 107 charged from the current SOC status to maximum charge (e.g., 100 percent) or to some percentage between the current SOC status and the maximum charge. Another constraint of the driver may include time constraints describing a time when charging of the electric vehicle 107 needs to be completed so that the driver can use the electric vehicle 107. For example, the driver may specify that the electric vehicle 107 must reach a specific SOC status (e.g., 100 percent) by 8:00 am.

In one embodiment, charging constraints also describe constraints of the charging station that will be used to charge the electric vehicle 107. The constraints may describe different charging station levels indicative of the amount of voltage and current available at an associated charging station to charge electric vehicles 107. For example, a level 1 charging station may be associated with a 110 volt/20 amp power outlet such as typical wall outlets found in most homes. A level 2 charging station may be associated with a 240 volt/50 amp power outlet such as outlets used to operate drying appliances. A level 3 charging station may describe a charging station with power outlets greater than 240 volt. Level 3 charging stations are considered fast charge stations and generally supply a 400 volt/100 amp power outlet that may be used to charge electric vehicles 107.

In one embodiment, the charging module 207 provides charging options to drivers of electric vehicles 107. According to one embodiment, the charging options include an option of "clean charge." The clean charge option maximizes or increases the usage of the renewable energy available on the grid 101 to charge an electric vehicle 107. If the driver selects the clean charge option, the charging module 207 calculates the charge parameters for the electric vehicle 107.

In one embodiment, the charge parameters describe a start time in which the charging module 207 instructs the electric vehicle 107 to begin charging. The start time is a time that allows enough time for the electric vehicle 107 to reach the required charge of the driver by the time specified by the driver. Generally, the start time may be the current time or some future time. In one embodiment, the stop time describes the time in which the electric vehicle 107 is instructed to stop charging. At the latest, the stop time is associated with the time in which charging must be complete as specified by the driver. However, the stop time may be any time between the start time and the driver specified time in which charging must be complete.

In one embodiment, the charging module 207 calculates the charge parameters for an electric vehicle 107 based on a historical clean energy profile associated with the current location of the electric vehicle 107, the current SOC status of the electric vehicle 107, the amount of voltage and current available at the charging station being used to charge the electric vehicle 107, and the charging constraints. Specifically, the charging module 207 calculates the total amount of time needed to charge the electric vehicle 107 to the required charge specified by the driver based on the current SOC status of the electric vehicle and the amount of voltage and current available at the charge station. The charging module 207 then analyzes the historical clean energy profile to determine a time period of the day in which the charging module 207 may charge the electric vehicle 107 for the total amount of time needed to charge the electric vehicle 107 which maximizes (i.e., increases the usage) the renewable energy available on the grid 101 while still meeting the constraints of the driver. The beginning of the determined time period describes the start time to begin charging the electric vehicle and the end of the determined time period describes the end time to stop charging the electric vehicle 107.

For example, the charging module 207 may determine that an electric vehicle 107 needs to be charged for 2 hours to reach the desired charge specified by the driver based on the current SOC status of the electric vehicle 107 and the amount of voltage available at the charge station. Furthermore, the driver may have specified that the electric vehicle 107 needs to be charged to the desired charge by 8 am. Referring back to Table 1, if the electric vehicle 107 was plug-in for charging at 6:00 pm, the charging module 207 may delay the start time to charge the electric vehicle 107 until 10:00 pm and stop charging the electric vehicle at 12:00 am to take advantage of the period between 11:00 pm and 12:00 am where the amount of available renewable energy on the electric grid 101 is at its maximum. Thus, the charging module 207 may delay the start time in order to maximize the usage of the renewable energy provided on the grid 101 during the time period between 10 pm and 12 am.

Once the charge parameters are calculated for an electric vehicle 107, the charging module 207 transmits instructions to the electric vehicle 107 to start and stop charging according to the charge parameters for the electric vehicle 107. In one embodiment, the charging module 207 may instruct the electric vehicle to stop or reduce the rate of charge if the grid 101 is approaching maximum capacity. This prevents power outages from occurring in the geographical area of the electric vehicle 107.

In one embodiment, the charging module 207 also provides an option to the user to "charge now." Selection of the charge now option causes the charging module 207 to instruct the electric vehicle 107 to begin charging immediately until the desired charge specified by the driver is reached. The charging module 207 also provides an option to the user to "charge later." The charge later option allows the user to delay when the charging module 207 instructs the electric vehicle 107 to begin charging. The driver may specify a start time to begin charging and an end time to stop charging and the charging module 207 charges the electric vehicle according to the times specified by the driver. Alternatively, the driver may specify a duration of time to charge the vehicle starting from the start time. For example, the driver may provide an instruction to the charging module 207 to charge the electric vehicle 107 for 3 hours starting at 6:00 pm but not provide an end time.

In another embodiment, the charging module 207 provides an option to "charge cheaply." The charge cheaply option causes the electric vehicle 107 to be charged during a time period that minimizes the monetary cost for charging the electric vehicle 107. In one embodiment, the utility company 103 may generate cost energy profiles describing the cost for energy during various time periods of the day. Thus, the cost energy profiles describe the time periods of the day when it is cheapest and most expensive to charge electric vehicles 107. The charging module 207 may calculate charging parameters to charge an electric vehicle 107 that minimize the cost to charge the electric vehicle 107 if the charge cheaply option is selected.

Method for Charging Electric Vehicles

Figure 3:
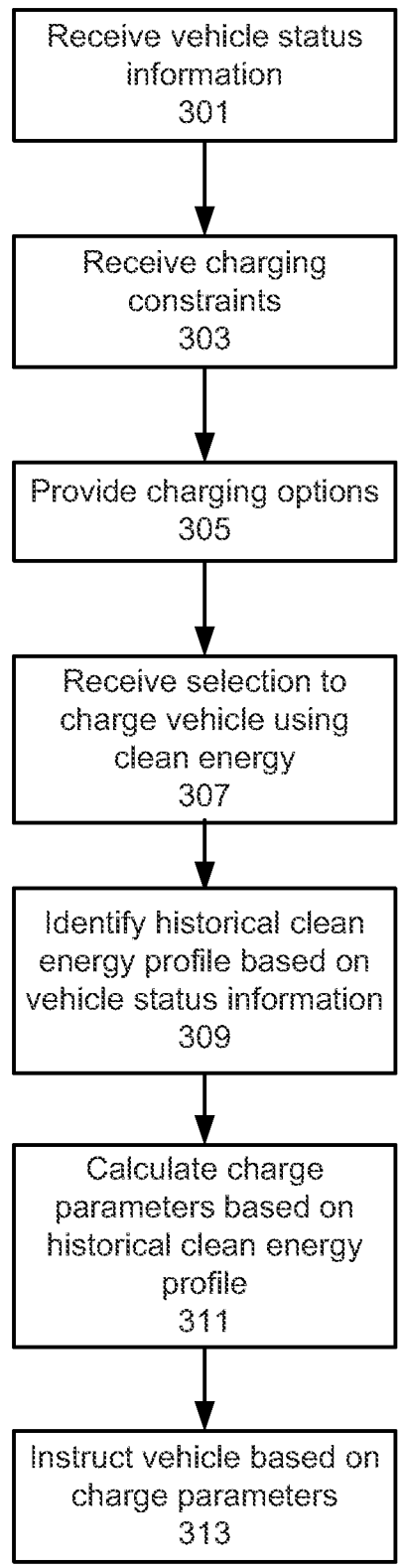
FIG. 3 illustrates a method for charging electric vehicles using electricity generated from renewable energy sources, according to one embodiment.

FIG. 3 illustrates one embodiment of a method of the charge scheduling server 105 to charge an electric vehicle 107. Note that in other embodiments, other steps may be performed other than those illustrated in FIG. 3

In one embodiment, the charge scheduling server 105 receives vehicle status information from an electric vehicle 107. The vehicle status information for the electric vehicle 107 describes the current date, current time, and the SOC status of the electric vehicle 107. The charge scheduling server 105 also receives 202 charging constraints describing constraints of the driver and constraints of the charging station used to charge the electric vehicle 107. In response, the charge scheduling server 105 provides 305 charging options to the driver. The charging options include options to charge clean, charge now, charge later, or charge cheaply.

The charge scheduling server 105 may receive 307 a selection to charge the electric vehicle 107 using clean energy. In response to the selection, the charge scheduling server 105 identifies 309 a historical clean energy profile based on the vehicle status information. Specifically, the charge scheduling server 105 obtains a historical clean energy profile from the utility company 103 associated with the geographical location in which the electric vehicle 107 is to be charged. The charge scheduling server 105 calculates 311 charge parameters based on the historical clean energy profile. In one embodiment, the charge parameters include the start time in which the charge scheduling server 105 instructs the electric vehicle 107 to begin charging and a stop time when the electric vehicle 107 is instructed to stop charging. The charge scheduling server 105 instructs 313 the electric vehicle 107 based on the charge parameters. That is, the charge scheduling server 105 instructs the electric vehicle 107 to begin and stop charging based on the charge parameters.

Conclusion

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer-implemented method of charging an electric vehicle, the method comprising:
    receiving vehicle status information from an electric vehicle indicating a geographical location of the electric vehicle, the vehicle status information received from the electric vehicle at a first time responsive to the electric vehicle being connected to an electrical grid;
    providing a plurality of options for charging the electric vehicle, the plurality of options including an option to maximize energy generated from renewable energy sources;
    identifying a historical clean energy profile associated with the geographical location of the electric vehicle responsive to receiving a selection of the option to increase usage of energy generated from the renewable energy sources, the historical clean energy profile describing a plurality of types of renewable energy that have been historically available during various time periods indicated in the historical clean energy profile;
    determining, by a computer, to delay charging of the electric vehicle until a second time that is later than the first time based on the historical clean energy profile and the received selection of the option to increase usage of the energy generated from the renewable energy sources; and
    instructing, by the computer, the electric vehicle to delay charging until the second time that is later than the first time, the delayed charging of the electric vehicle increasing usage of energy from the renewable sources that are available on the electrical grid at the second time.

2. The computer-implemented method of claim 1, wherein the vehicle status information further comprises a current date, a current time, and a state of charge of the electric vehicle.

3. The computer-implemented method of claim 1, further comprising:
    receiving charging constraints associated with the electric vehicle, the charging constraints describing constraints of a driver of the electric vehicle and constraints of a charging station that will be used to charge the electric vehicle.

4. The computer-implemented method of claim 3, wherein the constraints of the driver of the electric vehicle comprise at least one of a required state of charge of the electric vehicle indicated by the driver and a time for completion of charging the electric vehicle to the required state of charge.

5. The computer-implemented method of claim 3, wherein the constraints of the charging station comprise an amount of voltage and current available at the charging station.

6. The computer-implemented method of claim 1, wherein providing the plurality of options for charging the electric vehicle comprises:
    providing an option to immediately begin charging the electric vehicle;
    providing an option to delay charging of the electric vehicle to a later time; and
    providing an option to charge the electric vehicle during a time period that minimizes a cost for charging the electric vehicle.

7. The computer-implemented method of claim 1, wherein identifying the historical clean energy profile associated with the geographical location of the electric vehicle comprises:
    identifying a utility company that provides power to the geographical location via the electrical grid; and
    obtaining the historical clean energy profile from the utility company.

8. The computer-implemented method of claim 1, further comprising:
    calculating charge parameters based on the historical clean energy profile, a current state of charge of the electric vehicle, a required state of charge of the electric vehicle indicated by a driver of the electric vehicle, an amount of voltage and current available at a charging station, and a time when the electric vehicle must be charged to the required state of charge, the charge parameters comprising the second time for the electric vehicle to begin charging and a third time later than the second time for the electric vehicle to stop charging that is at the latest approximately equivalent to the time when the electric vehicle must be charged to the required state of charge.

9. The computer-implemented method of claim 8, wherein instructing the electric vehicle to delay charging comprises:
    instructing the electric vehicle to begin charging responsive to the second time; and instructing the electric vehicle to stop charging responsive to the third time.

10. The computer-implemented method of claim 1, wherein the renewable energy sources comprises at least one of a hydroelectric power plant, a solar thermal electric plant, a wind turbine, or a solar photovoltaic plant.

11. A computer program product comprising a non-transitory computer-readable storage medium containing executable computer program code for charging an electric vehicle, the code when executed performs steps comprising:
receiving vehicle status information from an electric vehicle indicating a geographical location of the electric vehicle, the vehicle status information received from the electric vehicle at a first time responsive to the electric vehicle being connected to an electrical grid;
providing a plurality of options for charging the electric vehicle, the plurality of options including an option to maximize energy generated from renewable energy sources;
identifying a historical clean energy profile associated with the geographical location of the electric vehicle responsive to receiving a selection of the option to increase usage of energy generated from the renewable energy sources, the historical clean energy profile describing a plurality of types of renewable energy that have been historically available during various time periods indicated in the historical clean energy profile;
determining to delay charging of the electric vehicle until a second time that is later than the first time based on the historical clean energy profile and the received selection of the option to increase usage of the energy generated from the renewable energy sources; and
instructing the electric vehicle to delay charging until the second time that is later than the first time, the delayed charging of the electric vehicle increasing usage of energy from the renewable sources that are available on the electrical grid at the second time.

12. The computer program product of claim 11, wherein the code when executed perform further steps comprising:
receiving charging constraints associated with the electric vehicle, the charging constraints describing constraints of a driver of the electric vehicle and constraints of a charging station that will be used to charge the electric vehicle.

13. The computer program product of claim 12, wherein the constraints of the driver of the electric vehicle comprise at least one of a required state of charge of the electric vehicle indicated by the driver and a time for completion of charging the electric vehicle to the required state of charge and wherein the constraints of the charging station comprise an amount of voltage and current available at the charging station.

14. The computer program product of claim 11, wherein identifying the historical clean energy profile associated with the geographical location of the electric vehicle comprises:
identifying a utility company that provides power to the geographical location via the electrical grid; and
obtaining the historical clean energy profile from the utility company.

15. The computer program product of claim 11, wherein the code when executed perform further steps comprising:
calculating charge parameters based on the historical clean energy profile, a current state of charge of the electric vehicle, a required state of charge of the electric vehicle indicated by a driver of the electric vehicle, an amount of voltage and current available at a charging station, and a time when the electric vehicle must be charged to the required state of charge, the charge parameters comprising the second time for the electric vehicle to begin charging and a third time later than the second time for the electric vehicle to stop charging that is at the latest approximately equivalent to the time when the electric vehicle must be charged to the required state of charge.

16. A computer system for charging an electric vehicle, the system comprising:
a computer processor;
a non-transitory computer-readable storage medium comprising executable computer program code when executed by the computer processor performs steps comprising:
receiving vehicle status information from an electric vehicle indicating a geographical location of the electric vehicle, the vehicle status information received from the electric vehicle at a first time responsive to the electric vehicle being connected to an electrical grid;
providing a plurality of options for charging the electric vehicle, the plurality of options including an option to maximize energy generated from renewable energy sources;
identifying a historical clean energy profile associated with the geographical location of the electric vehicle responsive to receiving a selection of the option to increase usage of energy generated from the renewable energy sources, the historical clean energy profile describing a plurality of types of renewable energy that have been historically available during various time periods indicated in the historical clean energy profile;
determining to delay charging of the electric vehicle until a second time that is later than the first time based on the historical clean energy profile and the received selection of the option to increase usage of the energy generated from the renewable energy sources; and
instructing the electric vehicle to delay charging until the second time that is later than the first time, the delayed charging of the electric vehicle increasing usage of energy from the renewable sources that are available on the electrical grid at the second time.

17. The computer system of claim 16, wherein the computer program code when executed by the computer processor perform further steps comprising:
receiving charging constraints associated with the electric vehicle, the charging constraints describing constraints of a driver of the electric vehicle and constraints of a charging station that will be used to charge the electric vehicle.

18. The computer system of claim 17, wherein the constraints of the driver of the electric vehicle comprise at least one of a required state of charge of the electric vehicle indicated by the driver and a time for completion of charging the electric vehicle to the required state of charge and wherein the constraints of the charging station comprise an amount of voltage and current available at the charging station.

19. The computer system of claim 16, wherein identifying the historical clean energy profile associated with the geographical location of the electric vehicle comprises:
identifying a utility company that provides power to the geographical location via the electrical grid; and
obtaining the historical clean energy profile from the utility company.

20. The computer system of claim 16, wherein the computer program code when executed by the computer processor perform further steps comprising:

calculating charge parameters based on the historical clean energy profile, a current state of charge of the electric vehicle, a required state of charge of the electric vehicle indicated by a driver of the electric vehicle, an amount of voltage and current available at a charging station, and a time when the electric vehicle must be charged to the required state of charge, the charge parameters comprising the second time for the electric vehicle to begin charging and a third time later than the second time for the electric vehicle to stop charging that is at the latest approximately equivalent to the time when the electric vehicle must be charged to the required state of charge.

* * * * *